United States Patent [19]
Howells

[11] Patent Number: 5,621,945
[45] Date of Patent: Apr. 22, 1997

[54] COLLECTION DEVICES

[75] Inventor: Paul E. Howells, Darlington, England

[73] Assignee: Electrolux Outdoor Products Limited, Durham, England

[21] Appl. No.: 349,943

[22] Filed: Dec. 6, 1994

[30]     Foreign Application Priority Data

Dec. 7, 1993 [GB] United Kingdom ............... 9325016

[51] Int. Cl.$^6$ ...................................................... A47L 5/16
[52] U.S. Cl. .................. 15/339; 15/344; 15/409; 241/56
[58] Field of Search ............................ 15/339, 330, 344, 15/345, 409; 241/56, 58

[56]                References Cited

U.S. PATENT DOCUMENTS

| | | | |
|---|---|---|---|
| 4,018,483 | 4/1977 | Smith | 15/409 |
| 4,325,163 | 4/1982 | Mattson et al. | 15/405 |
| 4,499,713 | 2/1985 | Stone | 15/345 |
| 4,817,230 | 4/1989 | Kiyooka | 15/344 |
| 5,245,726 | 9/1993 | Rote et al. | 15/344 |
| 5,280,667 | 1/1994 | Coathupe | 15/345 |

*Primary Examiner*—David Scherbel
*Assistant Examiner*—Terrence R. Till
*Attorney, Agent, or Firm*—Pearne, Gordon, McCoy & Granger

[57]                ABSTRACT

This invention relates to an apparatus for collecting debris including grass cuttings, vegetation, fallen leaves and other rubbish frequently encountered on gardens, public highways and parklands. In particular, the apparatus for collecting debris from a surface includes a collection duct having a mouth for receiving debris and an outlet through which debris is discharged into a receptacle, an impeller for establishing a flow of pressure air along the duct for collecting and conveying entrained debris therealong from the mouth to the outlet of the collection duct to the receptacle, and a cutting chamber including a cutting blade or cutting line disposed within the cutting chamber for reducing the size of at least a portion of the collected debris to be discharged into the receptacle.

19 Claims, 4 Drawing Sheets

COLLECTION DEVICES

BACKGROUND OF THE INVENTION

This invention relates to an apparatus for collecting debris including grass cuttings, vegetation, fallen leaves and other rubbish frequently encountered on gardens, public highways and parklands.

In our prior European Patent Application No. 0501675A1, which is incorporated herein in its entirety, there is described and claimed a collection device comprising a chassis, means for supporting the device above ground datum,, a source for establishing a flow of air, a duct directly or indirectly supported on the chassis for conveying loose material entrained in a stream of air from said source towards a downstream region thereof from a collection mouth at an upstream and thereof, a removable collection container for collecting said loose material and disposed in proximity to the downstream region of the duct, at least one air outlet disposed adjacent the collection mouth, each aperture serving to direct at least a portion of the stream of air downstream of the collection mouth so as to draw loose material into the mouth and transport the same via the duct into the collection container.

In our prior Patent Application No. 9224582.8, which is incorporated herein in its entirety, there is described and claimed an apparatus for collecting material from a surface comprising a duct for transporting material entrained in a stream of pressurized air from a collection mouth at an upstream end of the duct to a downstream region of the duct for collection; and at least one air inlet opening into the duct for delivering pressurized air to form a primary air stream directed generally downstream of the duct;

a source for generating the pressurized air and passing the air to the said at least one air inlet, characterized in that the duct includes an access port disposed downstream from the collection mouth and in that the apparatus includes a source for imparting energy to the stream of pressurized air in the duct via the access port thereby increasing the suction in the duct.

Reference is also drawn to European Patent Application No. 91301472.6 (claiming priority for U.K. Patent Application No. 90044076.7) which is imported in its entirety into this specification.

In our prior European Patent Application No. 93304750.8 which is incorporated in its entirety into this specification, there is described and claimed an apparatus for collecting material from a surface comprising a duct for transporting material entrained in a stream of pressurized primary air from a collection mouth at an upstream end of the duct to a downstream region of the duct for collection, at least one primary air inlet opening into the duct for delivering pressurized air to form a primary air stream directed generally downstream of the duct, at least one secondary air outlet for delivering pressurized air to form a secondary air stream directed into an area of the surface confronting the collection mouth, the secondary air stream serving to dislodge material on the said confronting area for entrainment in the primary air stream and transportation from the collection mouth to the downstream region of the duct for collection.

Although machines described in the various applications mentioned fulfil their respective operational requirements adequately, we have found that the amount of material collected is restricted by not only the size of the receptacle but also by the nature of the collected material necessitating frequent emptying of the receptacle. It is, therefore, an object of the present invention to improve the collection capacity of such machines.

SUMMARY OF THE INVENTION

According to one aspect of the present invention, apparatus for collecting debris from a surface includes a collection duct having a mouth for receiving debris and an outlet through which debris is discharged into a receptacle, means for establishing a flow of pressure air along the duct for collecting and conveying entrained debris therealong from the mouth to the outlet of the collection duct to the receptacle, and a cutting chamber including a reducing means disposed within the cutting chamber for reducing the size of at least a portion of the collected debris to be discharged into the receptacle. Conveniently, the reducing means is disposed in the region of the outlet of the collection tube. Preferably, the reducing means comprises a cutting member mounted for angular displacement transversely within the outlet. If desired, the cutting member may be disposed either upstream or downstream of the outlet.

The cutting member may be a rotatable blade or disc. Preferably, the cutting member is in the form a flexible cutting line such as that used in garden trimmers or in the form of replaceable blades.

According to another aspect of the present invention an apparatus for collecting debris from a surface comprises a duct for transporting debris entrained in a stream of pressurized primary air from a collection mouth at an upstream end of the duct to a downstream region of the duct and for discharge into a receptacle, means for establishing a flow of pressure air, at least one primary air inlet opening into the duct for delivering pressurized air to form the primary air stream directed generally downstream of the duct, at least one secondary air outlet for selectively delivering pressurized air to form a secondary air stream directed onto an area of the surface confronting the collection mouth, the secondary air stream serving to dislodge debris on the said confronting area for entrainment in the primary air stream and transportation of the debris from the collection mouth downstream of the duct for discharging into a cutting chamber disposed at a position displaced from the collection mouth for receiving entrained debris, the cutting chamber including a reducing means for reducing the size of at least a portion of the collected debris.

BRIEF DESCRIPTION OF THE DRAWINGS

Embodiments of the present invention will now be described by way if example, with reference to the accompanying drawings in which.

DETAILED DESCRIPTION OF PREFERRED EMBODIMENTS

Figures 1, 1A:
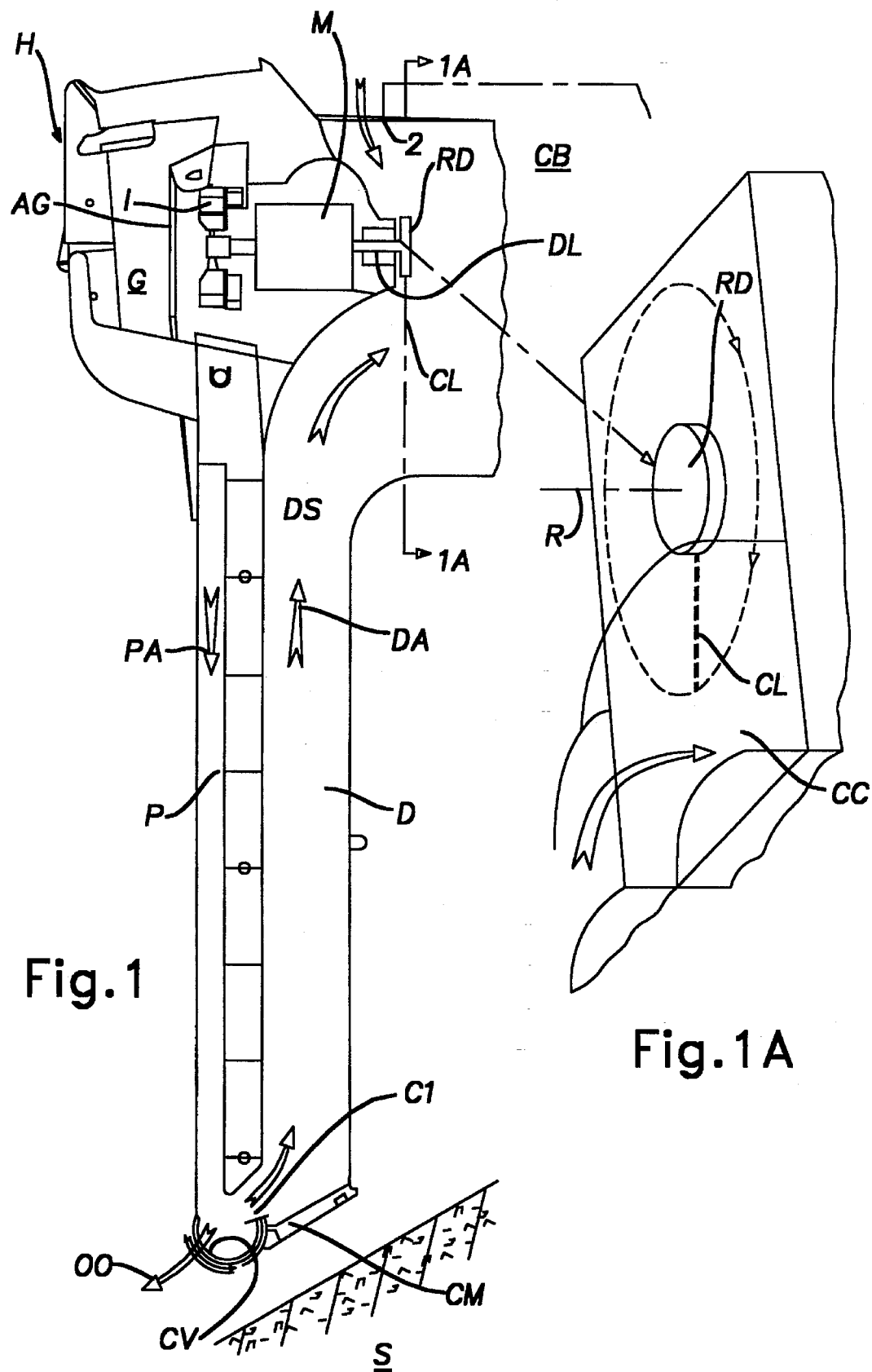
FIG. 1 is a longitudinal section of the collection apparatus according to a first embodiment.
FIG. 1A is a part diagrammatic perspective part rather along line 1A—1A of FIG. 1.

FIG. 1 shows the collection apparatus according to a first embodiment of the present invention in an operating position relative to a surface S from which material is to be collected. The surface S is drawn obliquely for reasons of clarity only.

The apparatus comprises a duct D, a plenum chamber P, a handle member H, a Suction pump or air impeller G and a collection receptacle CB. The suction pump G includes an impeller I and an electric motor M and an air inlet grid AG permits air to be drawn into the suction pump. A collection mouth CM is positioned at the upstream end of the duct D and pressure air PA from the pump G passes along plenum chamber P to enter the duct D via inlet C1. The collection receptacle CB is positioned in the downstream region DS of the duct D. An internal combustion engine may be used to replace the electric motor M.

In operation, air is drawn into the suction pump G through pump inlet grid AG. After passing through the inlet opening C1, pressurized air forms a primary stream of pressurized air which due to a pressure differential relative to atmospheric pressure picks up material disposed on the surface S in the region of the collection mouth CM, and carries it into the duct D in the direction indicated by arrow DA.

In the downstream region DS of the duct D, the stream of primary pressurized air is directed to the collection receptacle CB while a further stream of atmospheric air is drawn through the access port 2 into the collection receptacle CB to produce a lower pressure in the duct D.

Figure 2:
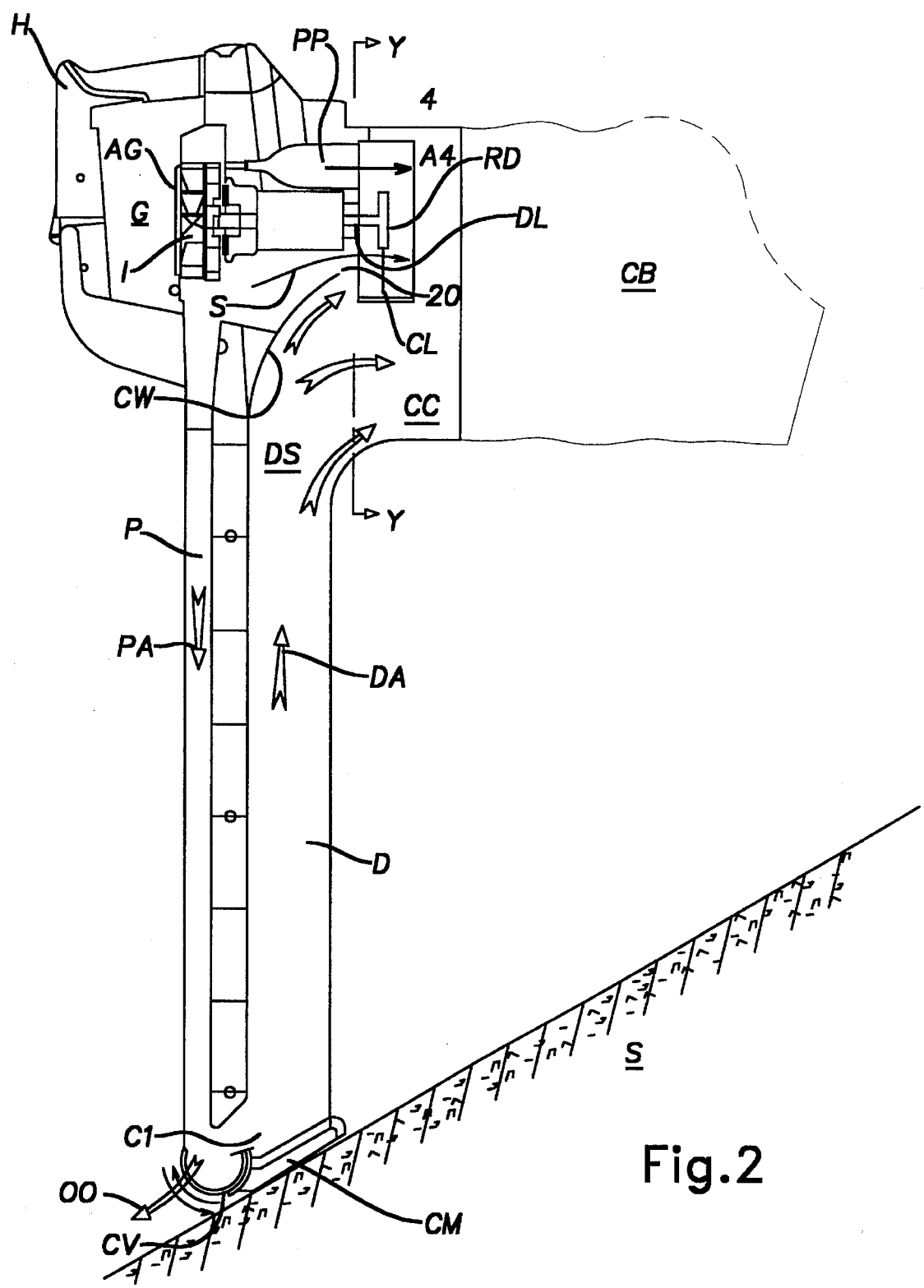
FIG. 2 is a longitudinal section of the collection apparatus according to a second embodiment.

FIG. 2 shows an apparatus for collecting material according to a second embodiment of the invention. The common components in FIG. 1 and FIG. 2 are labelled with the same reference signs. In operation of the apparatus of FIG. 2 a stream of pressurized air carrying the collected material is directed through the duct D into the collection receptacle CB.

A stream of pressurized air S is directed from the pump G into a portion of the duct D downstream of the collection mouth CM through an access port 20. The stream of pressurized air S is directed towards the collection receptacle CB in a substantially downstream direction, thereby assisting the primary stream of air to flow in a downstream direction. This results in a decreased pressure in the duct and, therefore, increased suction at the collection mouth CM.

In another arrangement, a stream of pressurized air A4 may be directed through a passage PP directed into the collection receptacle CB. The stream of pressure air A4 also has the effect of lowering the pressure in the duct D.

It is apparent from the description of both illustrated embodiments that it is possible to produce a collection apparatus according to a further embodiment which combines both embodiments. For example, the apparatus may include means (not shown) for selectively directing a portion of the stream of pressure air DA from the duct D to the pump G. Such means may be a valve, operable by a user and located in a curved wall CW at the downstream end of the duct D. Such a structure results in a further reduction in the pressure in the duct and, therefore, improves the degree of suction at the collection mouth CB.

Figure 3:
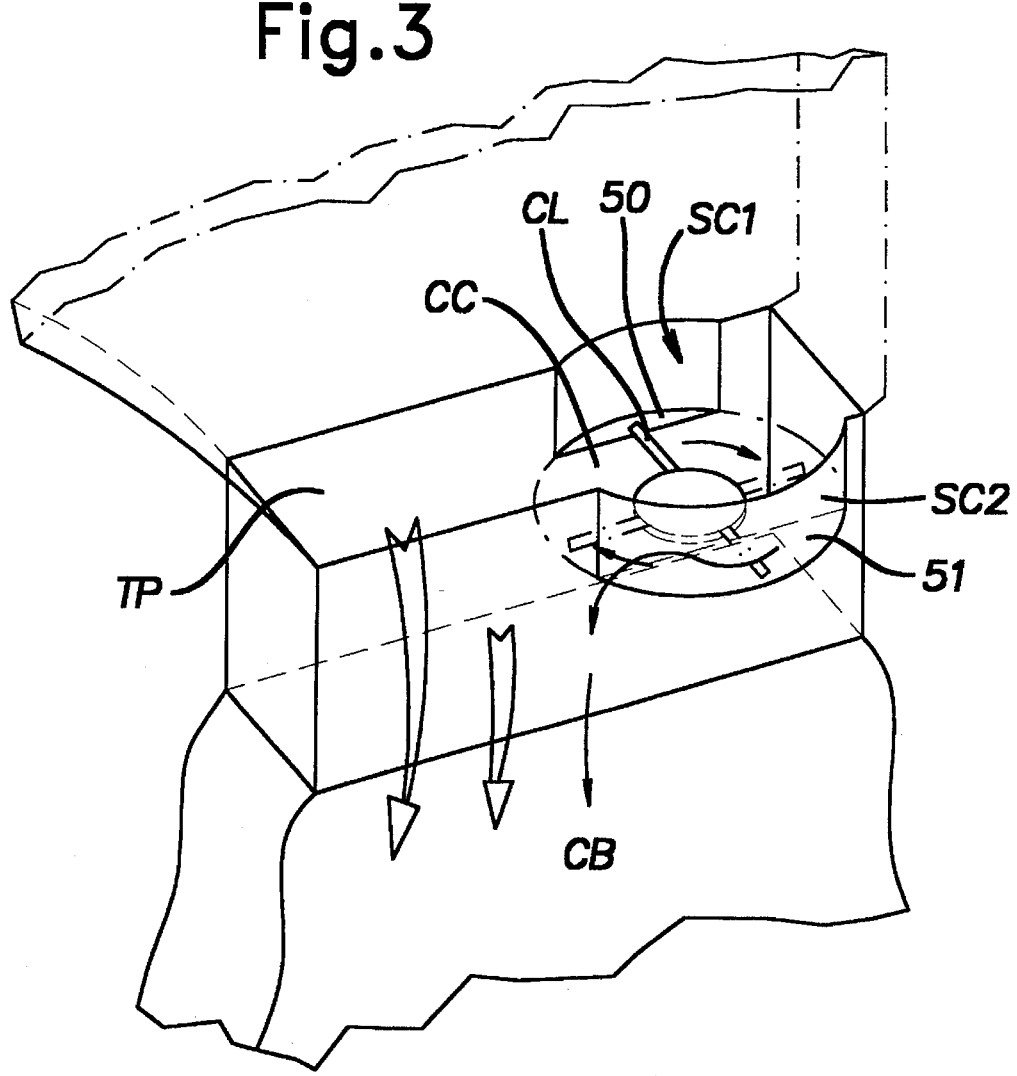
FIG. 3 is a diagrammatic perspective of a cutting chamber of the embodiment shown in FIG. 2.
Figure 4:
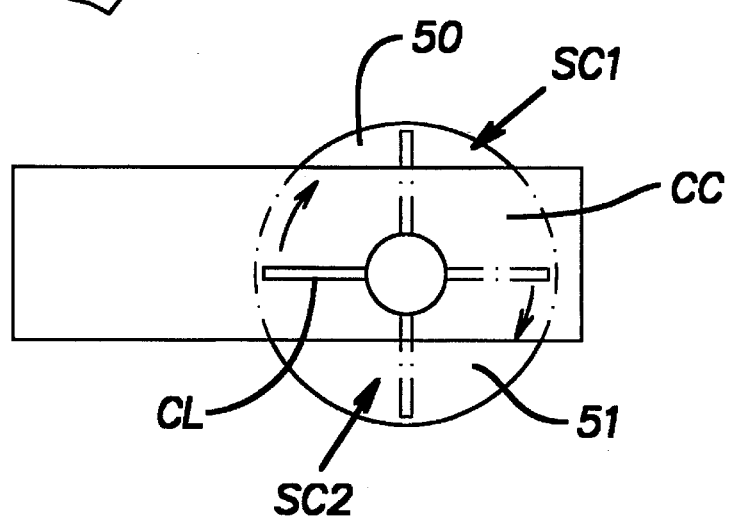
FIG. 4 is a plan of the cutting chamber of Figure.

One form of cutting chamber CC is shown in FIGS. 3 and 4 and includes a through flow passage TP and two subsidiary chambers SC1 and SC2. Each subsidiary chamber SC1 and SC2 is in the form of a segment of a cylinder and each having an open end which is open to incoming debris and closed ends 50 and 51. The closed ends 50, 51 act as baffles reducing the tendency of entrained debris passing unimpeded through the cutting chamber and thereby increasing the possibility of reduction thereof by the reducing means. It will be seen from FIG. 4 that the two subsidiary cutting chambers are of different radial (transverse) extent relative to the center of rotation R of the reducing means. Such a geometrical structure produces a cutting chamber which geometrically assists in producing a swirling effect on reduced debris and thereby assist in ejection of reduced material into the collection receptacle CB under the flow of pressure air. If desired, the closed end 50, 51 may be axially or helically included towards the collecting receptacle to aid deposition in the receptacle. The throughflow passage TP permits larger debris such as cans to pass directly into the collection receptacle CB.

Figure 5:
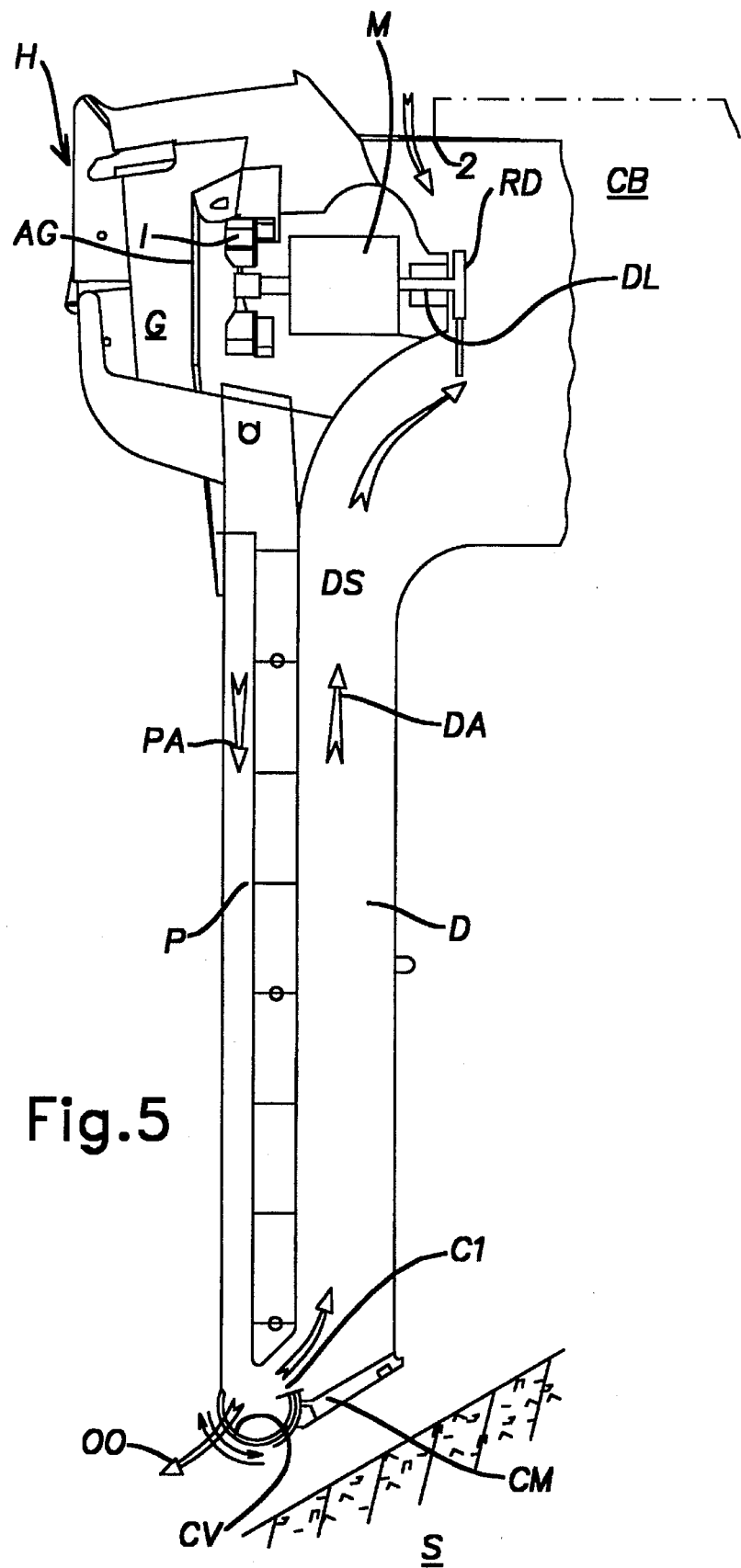
FIG. 5 is a longitudinal section of a variation of the collection apparatus of FIG. 1 with a cutting blade.

The reducing means includes a cutting member which is preferably a flexible cutting line CL (FIGS. 1–4) such as used in garden trimmers. The cutting member may also be a replaceable rotating blade B (FIG. 5).

The cutting chamber CC may be moulded or fabricated as an integral part of the apparatus, as a separate unit, or as part of a supporting structure for the collection receptacle CB.

Referring to FIG. 1 and 2 a part cylindrical valve member CV is angularly displaceable in the direction of arrows indicated to open or close inlet C1. When inlet C1 is closed pressure air is directed from the plenum chamber away from the apparatus in the direction of arrow OO blowing debris to be collected into a pile prior to closure of the valve CV and subsequent collection by the apparatus. Such a facility is described and claimed in the patent applications and referred to in the introductory part of this specification.

The collection apparatus can also be readily modified for use with a remote pump, that is, with the pump connected to the plenum chamber P using a flexible hose or with a remote collection receptacle connected to the downstream DS region of the apparatus by a flexible hose.

In the foregoing, a drive line DL to the cutting member CL has been described as driven by the motor M which may be an electric motor or an internal combustion engine. Alternatively, pressure air may be directed from the downstream region of the duct D through, for example, a valve not shown in the wall CW. Such diverted air may be used to drive a vaned impeller from which the reducing means RD is driven. Such a structure can be readily designed by a person skilled in air management and fluidics.

I claim:

1. An apparatus for collecting debris from a surface, said apparatus comprising:

a receptacle;

a collection duct having a mouth for receiving debris and an outlet through which debris is discharged into said receptacle;

means for establishing a flow of pressure air;

an air inlet opening into the duct in the region of the mouth for delivering the flow of pressure air into the collection duct in a direction along the duct for collecting and conveying entrained debris therealong from the mouth to the outlet of the collection duct; and reducing means including a cutting member disposed at a position displaced from the mouth for receiving entrained debris and for reducing the size of at least a portion of the collected debris prior to discharge thereof into the receptacle.

2. An apparatus according to claim 1, further comprising at least one air outlet for delivering pressure air to form a secondary air stream which, in use, is directed onto the surface confronting the mouth, the secondary air stream serving to dislodge debris on the surface for entrainment.

3. An apparatus according to claim 1, further comprising a cutting chamber in which the cutting member is disposed, said cutting chamber including at least one baffle extending inwardly for restricting passage of debris from the cutting chamber into the receptacle.

4. An apparatus according to claim 3, wherein there are two of said baffles each extending inwardly of the cutting chamber by differing amounts.

5. An apparatus according to claim 1, further comprising a cutting chamber in which the cutting member is disposed, said cutting chamber including a through flow passage and at least one transverse subsidiary chamber which opens generally transversely into the passage, relative to the direction of passage of the entrained debris, said at least one transverse subsidiary chamber including a baffle extending in a transverse direction of the passage to retain at least a portion of the debris within the cutting chamber during reduction.

6. An apparatus according to claim 5, wherein there are two of said subsidiary chambers of differing transverse extent.

7. An apparatus according to claim 6, wherein each subsidiary chamber is a segment of a cylinder, each segment having an open end facing incoming debris and a closed end which constitutes a baffle for restraining passage of debris thorough the cutting chamber during reduction.

8. An apparatus according to claim 1, wherein said cutting member is a rotatable cutting blade.

9. An apparatus according to claim 1, wherein said means for establishing a flow of pressure air draws in ambient air and directs the flow of pressure air to the air inlet.

10. An apparatus according to claim 1, wherein said means for establishing a flow of pressure air is dedicated to directing the flow of pressure air to the air inlet.

11. An apparatus according to claim 1 or 10, wherein the means for establishing a flow of pressure air includes a fan and the entrained debris is collected and reduced without passing through the fan.

12. An apparatus according to claim 1, wherein said cutting member is a rotatably mounted flexible cutter line.

13. An apparatus according to claim 12, wherein said cutter line is operable with an arc of rotation overlying at least part of the duct.

14. An apparatus according to claim 12, wherein said cutter line is rotatable at the discharge outlet of the duct.

15. An apparatus according to claim 1, further comprising a motor which drives said means for establishing a flow of pressure air.

16. An apparatus according to claim 15, wherein said motor also drives said reducing means.

17. An apparatus according to claim 16, further comprising a drive line from which said means for establishing a flow of pressure air and said reducing means are driven.

18. An apparatus according to claim 16 or 17, wherein said means for establishing a flow of pressure air and the reducing means are driven from opposite sides of the same motor.

19. An apparatus for collecting debris from a surface, said apparatus comprising:

a duct having an upstream end, a downstream region, and a collection mouth disposed at the upstream end of the duct, said duct serving to transport debris entrained in a stream of pressurized primary air from the collection mouth to the downstream region of the duct, and to discharge the debris from the downstream region of the duct;

a receptacle into which debris is discharged from the downstream region of the duct;

means for establishing a flow of pressure air;

at least one primary air inlet opening into the duct for delivering pressurized air into the duct to form the primary air stream directed generally downstream in the duct;

at least one air outlet for delivering pressurized air to form a secondary air stream directed onto the surface confronting the collection mouth, the secondary air stream serving to dislodge debris on the surface for entrainment in the primary air stream;

a cutting chamber disposed at a position displaced from the collection mouth for receiving entrained debris; and reducing means including a cutting member within the cutting chamber for reducing the size of at least a portion of the collected debris.

* * * * *